F. R. JAEGER.
CLUTCH.
APPLICATION FILED JUNE 14, 1918.
1,300,398.
Patented Apr. 15, 1919.
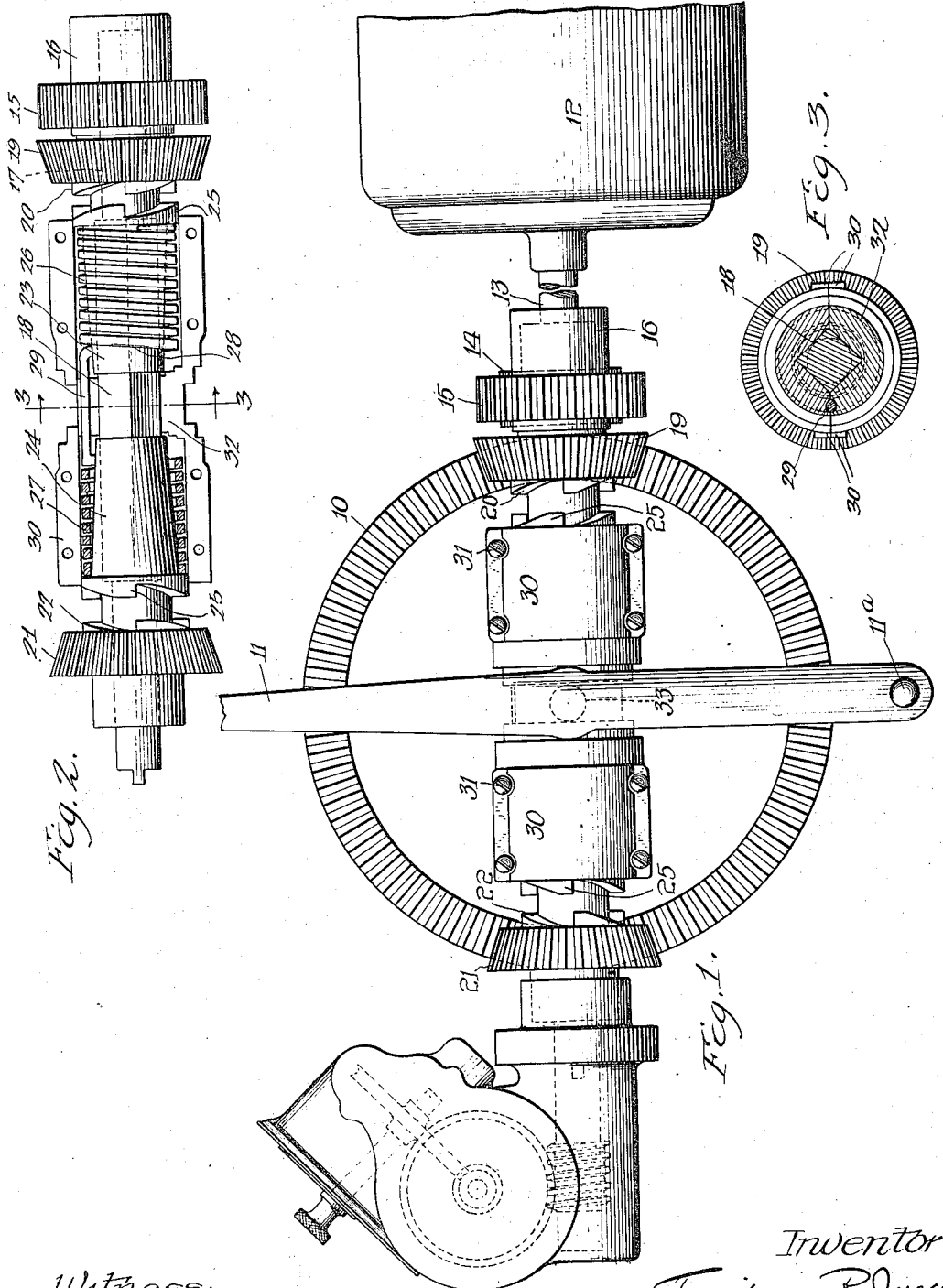

UNITED STATES PATENT OFFICE.

FRIEDEMAN R. JAEGER, OF OAK PARK, ILLINOIS.

CLUTCH.

1,300,398. Specification of Letters Patent. Patented Apr. 15, 1919.

Application filed June 14, 1918. Serial No. 239,915.

*To all whom it may concern:*

Be it known that I, FRIEDEMAN R. JAEGER, a citizen of the United States, residing at Oak Park, in the county of Cook and State of Illinois, have invented certain new and useful Improvements in Clutches, of which the following is a specification.

My invention concerns improvements and features of novelty and advantage in clutch-mechanisms, and controlling means governing their actuation. More specifically, the clutch appliance is a duplex or double-ended apparatus provided with suitable interposed spring or cushion means which transmits the power and which permits the driving mechanism to gradually assume the load so that the machine being operated may be actuated smoothly and without harshness or irregularity. The device is particularly adapted for use in washing-machines having rotary-drums which alternatively revolve in one direction a given number of times and then automatically reverse the direction of such rotation, but it is to be understood, however, that its employment is not limited or restricted to any particular line of industry or types or styles of devices.

In order that those skilled in this art may have a full and complete understanding of the structural and functional advantages of this new apparatus, I have illustrated in the accompanying drawings, forming a part of this specification, and throughout the various views of which like reference characters refer to the same parts, a preferred and desirable embodiment of the invention, which, however, is susceptible of various other embodiments and which is not limited and restricted in any way to the precise and exact structural features presented.

In these drawings:

Figure 1 is an elevation of the device;

Fig. 2 is an elevation of the clutch portion proper with one section of the casing removed and one part of the cushion spring in section; and Fig. 3 is a cross-section through the middle of the clutch appliance on line 3—3 of Fig. 2.

The main machine, such as a washing-machine, which is driven through this clutch mechanism, is not illustrated, but this part of the apparatus is fully presented in my Patent No. 1,252,698, mechanical movements, granted January 8, 1918. Such washing or other machine is driven by a main bevel-gear 10 and an associated mechanism is adapted at proper timed intervals to swing or shift a lever or handle 11 fulcrumed at 11ᵃ in opposite directions to operate the clutch or power-transmitting mechanism, whereby to secure the reversals in direction of rotation of the drum of the machine. This arm or lever manipulating device is fully presented in the patent referred to and requires no added explanation here.

The particular appliance of this application comprises any suitable source of power, such as an electric motor 12, which drives a shaft 13 and a spur-gear 14, the teeth of which are in mesh with a similar spur-gear 15 fixed, pinned, or keyed on a cylindrical or round end portion 16 of a shaft characterized as a whole, 17, the main central section 18 of which is square or angular in cross-section. No attempt has been made to show correctly or in detail the bearings for such shaft; they may be of any suitable construction and disposition. On, and freely revoluble on the round part 16 of such shaft and next to the spur-gear 15 is a bevel-pinion 19 having on its face remote from gear 15 a series of the usual bevel clutch-teeth 20, 20, thus making the gear one of the clutch-elements. Gear 19 is always in mesh with the teeth of the large, main bevel-gear 10 and either revolves idly on shaft 17 or else drives gear 10, depending upon whether it is disconnected from or clutched to its shaft which constantly rotates at a given speed in one direction.

In similar manner, the opposite, cylindrical end-portion of the shaft is equipped with a bevel-pinion 21 free to rotate thereon and having on one face clutch teeth or projections 22. Such gear is constantly in mesh with the main bevel-gear 10 but at a point diametrically opposite the companion gear 19. The ends of the squared middle part of the shaft form shoulders against which the hubs of the gears 19 and 21 bear.

Fitted over such intermediate angular or squared portion of the shaft and free to turn thereon, are a pair of oppositely-disposed sleeves 23, 24, respectively, each having a central round hole extended therethrough receiving the squared shaft thus permitting their rotation independently of the shaft, each sleeve at its outer end having clutch-teeth or lugs 25 adapted to interfit and mesh with the teeth of the corresponding bevel-pinion when slid lengthwise of the shaft into such relation. These sleeves, as is indicated in Fig. 2, are slightly tapered externally, that is, gradually reduced in outer diameter toward their proximate or inner ends, and fitted over them are the reversely-wound, spiral, end-portions 26, 27, of a duplex, torsional spring characterized as a whole, 28. The outer ends of such springs, that is to say, their end coils next to the clutch teeth of the sleeves, are sufficiently tight on the latter so as to prevent turning thereon, but the remainder of the convolutions of these portions of the springs are somewhat loose over the tapered outer faces of the sleeves, permitting tightening their grip on the sleeves by turning them in the direction of their spiral convolutions, thus somewhat decreasing their internal diameters. The adjacent ends of these spring portions are connected together by a straight intermediate wire or middle portion 29 integral, of course, with both parts, and disposed parallel to the axis of the shaft.

Removably fitted over this middle section of the shaft. the two sleeves, and the duplex spring, is a two-part divided shell 30, the pair of halves of which are held together by screws 31, 31. This shell or casing driving-member has a central part 32 with a square hole therethrough adapted to accommodate that part of the square shaft between the sleeves, whereby a driving connection is thus secured between the constantly-rotating shaft and the shell. The two meeting or matching longitudinal halves of the part 32 of such shell are each lengthwise grooved to accommodate a half of the thickness of the portion 29 of the spring, (Fig. 3) so that when the sections of member 30 are fitted or secured together this intermediate, connecting, straight, middle portion will pass through the reduced part 32 of the shell and cause the sleeves and their associated double spring to rotate with the shaft. Stated somewhat otherwise, the shaft rotates the shell, the latter revolves the spring by a direct driving connection with its middle portion 29, and the spring in turn rotates both sleeves and clutch parts, one actively (the one in mesh with its companion), and the other passively or idly. This relation, of course, is susceptible of reversal, the former active clutch becoming idle, and vice versa.

At its middle, the outer surface of shell 30 has an annular groove receiving lever 11 and a pin 33 whereby rocking of the lever will slide the shell, the sleeves, and the spring as a whole or unit, in one direction or the other, bringing the clutch-teeth of the one sleeve or the other, as the case may be, into coöperative relation with the clutch-teeth of the adjacent bevel-pinion. This occurs, of course, while the shaft is turning, and, as soon as the clutch-elements are thus brought into driving relation, the continuous turning of the shaft winds up the corresponding coiled end portion of the spring which gradually contracts upon the sleeve coil by coil because of the taper of the sleeve, until it is fully contracted upon the sleeve, preventing further twisting, whereupon the shaft, through the part 32 of the shell, the spring, the sleeve, and the clutch, drives the pinion as a solid or rigid power-transmitting means. In this way the taking up of the load on to the shaft is gradual and cushioned and shocks are wholly avoided.

Obviously, when the handle or lever is rocked in the opposite direction, the other clutch is made operative, the other spring-portion wound up and contracted upon its sleeve in similar manner, and then employed as a rigid power-conveying medium. The main gear 10, of course, is now rotated in the opposite direction because of the positions of pinions 19 and 21 on opposite sides of its axis.

One embodiment only of the invention has been detailed in the belief that such will be sufficient for a full understanding of the various features of the invention, but it is to be clearly appreciated that the invention is not limited or restricted to these precise and exact mechanical details which are susceptible of more or less radical changes without departure from the principle of the invention.

I claim:

1. In a mechanism of the character described, the combination of a shaft, a pair of companion clutch-elements, means to shift said elements into and out of coöperative relation, a sleeve fitted over said shaft to which one of said clutch-elements is connected, a rotary driving-means, and a torsional-spring-connection secured to said driving-means and to said sleeve and fitted over the sleeve through which spring connection the driving power is transmitted, the spring being constructed to be gradually contracted upon said sleeve through the torsional action of said driving-means, whereby the spring acts as a preliminary driving cushion until such contraction is completed, said encircling spring connection and said sleeve being relatively tapered to secure the gradual elimination of the spring cushion action, substantially as described.

2. In a mechanism of the character described, the combination of two sets of coöperating clutch-elements, means to shift said elements to render the one or the other set operative, a rotary driving-means, and a torsional-spring-connection between said driving-means and one of the clutch-elements of each set, comprising a spring having reversely-coiled end-portions connected to the clutch-elements and an intermediate part operatively associated with said driving means, substantially as described.

3. In a mechanism of the character described, the combination of two sets of coöperating clutch-elements, means to shift said elements to render the one or the other set operative, a rotary driving-means, a member connected to a clutch-element of each set, and a torsional-spring-connection between said driving-means and said members comprising a spring having a reversely-coiled end-portions surrounding said members and adapted to be contracted thereupon, and an intermediate part associated with said driving-means, substantially as described.

4. In a mechanism of the character described, the combination of two sets of coöperating clutch-elements, means to shift said elements to render the one or the other set operative, a rotary driving-means, a member connected to a clutch-element of each set, said members being reversely tapered, and a torsional-spring-connection between said driving-means and said members comprising a spring having reversely-coiled end-portions surrounding said members and constructed to be contracted thereupon, and an intermediate part associated with said driving-means, substantially as described.

5. In a mechanism of the character described, the combination of a shaft, two sets of coöperating clutch-elements, two tapered sleeves on said shaft each connected to a clutch-element of one of said sets, a rotary driving-means associated with said shaft, and a torsional-spring for said clutches comprising a spring having reversely-coiled end portions surrounding, connected to, and adapted to be gradually contracted on said sleeves, and an intermediate portion operatively associated with said driving-means, substantially as described.

6. In a mechanism of the character described, the combination of a shaft, two sets of clutch-elements, a sleeve on said shaft for and connected to each of said clutch sets, a spring having reversely-coiled portions each inclosing and secured to one of said sleeves but capable of contraction thereon by twisting the spring, a shell fitted over said spring and operatively connected to said shaft, and a driving-connection between said shell and a portion of said spring between its oppositely-coiled portions, substantially as described.

FRIEDEMAN R. JAEGER.